US010785722B2

(12) United States Patent
Song et al.

(10) Patent No.: US 10,785,722 B2
(45) Date of Patent: *Sep. 22, 2020

(54) WAKEUP SYSTEM AND METHOD FOR DEVICES IN POWER SAVING MODE

(71) Applicant: Verizon Patent and Licensing Inc., Arlington, VA (US)

(72) Inventors: Lei Song, Fremont, CA (US); Ye Huang, San Ramon, CA (US); Jin Yang, Orinda, CA (US); Yee Sin Chan, San Jose, CA (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/358,922

(22) Filed: Mar. 20, 2019

(65) Prior Publication Data

US 2019/0223103 A1 Jul. 18, 2019

Related U.S. Application Data

(63) Continuation of application No. 15/722,504, filed on Oct. 2, 2017, now Pat. No. 10,285,129, which is a (Continued)

(51) Int. Cl.
*H04W 52/02* (2009.01)
*H04W 40/24* (2009.01)
(Continued)

(52) U.S. Cl.
CPC ........ *H04W 52/0235* (2013.01); *G06F 1/325* (2013.01); *G06F 1/3206* (2013.01); *H04W 40/244* (2013.01); *H04W 52/0209* (2013.01); *H04W 40/005* (2013.01); *H04W 52/0219* (2013.01); *H04W 52/0229* (2013.01);
(Continued)

(58) Field of Classification Search
CPC ........ H04W 52/0235; H04W 52/0209; H04W 40/244; H04W 40/005; H04W 52/0229; H04W 52/0219; G06F 1/3206; G06F 1/325

See application file for complete search history.

(56) References Cited

U.S. PATENT DOCUMENTS 7,010,024 B1 3/2006 Eerola et al.
7,129,888 B1 10/2006 Chesley
(Continued)

*Primary Examiner* — Hashim S Bhatti

(57) ABSTRACT

A computer device may include a memory storing instructions and a processor configured to execute the instructions to select a broadcast method for a wakeup signal for a wireless communication device; instruct a base station to broadcast the wakeup signal using the selected broadcast method; and provide information identifying the selected broadcast method to the wireless communication device. The processor may be further configured to receiving a wakeup request from a machine-type communication interworking function (MTC-IWF) device; map the received wakeup request to a wakeup signature beacon signal associated with the wireless communication device; and instruct the base station to transmit a wakeup signature beacon signal to the wireless communication device based on the received wakeup request.

20 Claims, 13 Drawing Sheets

Related U.S. Application Data continuation-in-part of application No. 14/795,235, filed on Jul. 9, 2015, now Pat. No. 9,998,989.

(51) Int. Cl.
  *G06F 1/3234* (2019.01)
  *G06F 1/3206* (2019.01)
  *H04W 40/00* (2009.01)

(52) U.S. Cl.
  CPC ...... *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/26* (2018.01)

(56) References Cited

U.S. PATENT DOCUMENTS

| | | | |
|---|---|---|---|
| 9,107,164 B1 | 8/2015 | Troyanker et al. | |
| 9,491,024 B2 | 11/2016 | Zhang et al. | |
| 2006/0176837 A1 | 8/2006 | Son et al. | |
| 2012/0069893 A1* | 3/2012 | Shirakata | H04L 27/06 375/239 |
| 2012/0321007 A1 | 12/2012 | Feher | |
| 2014/0269462 A1* | 9/2014 | Jia | H04W 52/0229 370/311 |
| 2014/0344604 A1 | 11/2014 | Paljug | |
| 2015/0003348 A1 | 1/2015 | Ishii et al. | |
| 2015/0003575 A1 | 1/2015 | Mallinson | |
| 2015/0028838 A1 | 1/2015 | Kang | |
| 2015/0117285 A1* | 4/2015 | Xie | H04W 52/0216 370/311 |
| 2015/0230063 A1* | 8/2015 | Chandramouli | H04L 12/189 455/466 |
| 2015/0319172 A1* | 11/2015 | Zhang | H04L 63/0869 713/169 |
| 2016/0373237 A1* | 12/2016 | Shellhammer | H04L 27/2675 |
| 2017/0013553 A1* | 1/2017 | Huang | H04W 8/04 |
| 2017/0019749 A1* | 1/2017 | Koshimizu | H04W 8/24 |

* cited by examiner

Plot of a Zadoff-Chu sequence for u = 7, N = 353

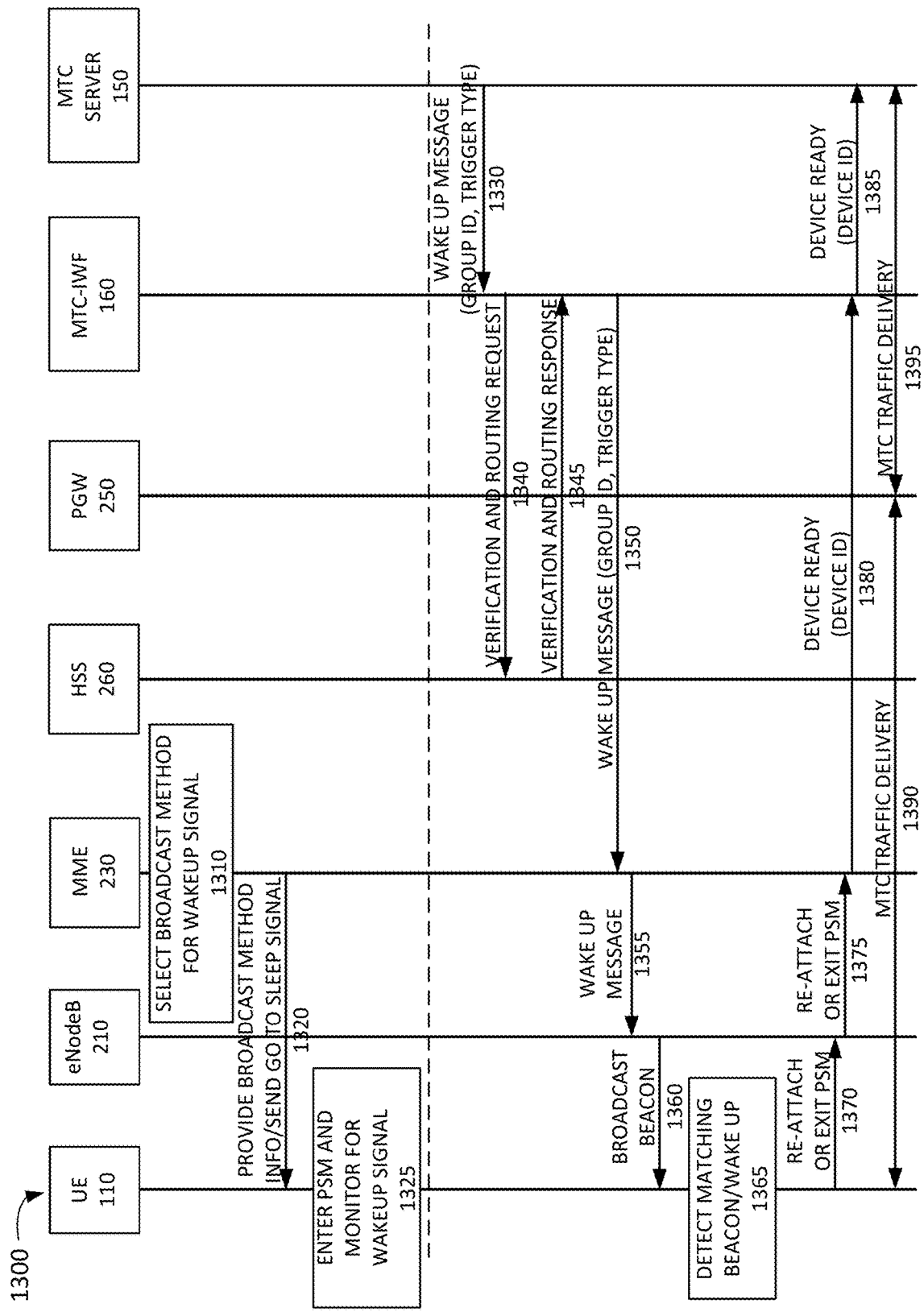

WAKEUP SYSTEM AND METHOD FOR DEVICES IN POWER SAVING MODE

This patent application is a continuation of U.S. patent application Ser. No. 15/722,504, entitled "WAKEUP METHOD FOR DEVICES IN POWER SAVING MODE" and filed on Oct. 2, 2017, which is a continuation-in-part of U.S. patent application Ser. No. 14/795,235, entitled "WAKEUP METHOD FOR DEVICES IN POWER SAVING MODE" and filed on Jul. 9, 2015, both of which are hereby incorporated herein by reference in their entirety.

BACKGROUND INFORMATION

Many electronic devices require low power consumption in order to keep the device operational for long periods of time without having to recharge the battery. As an example, wireless devices that are mounted in a hard to reach location may be powered by a battery that is supposed to last for one to two years. As another example, a medical device carried on person by a patient and powered by a battery may have a battery life requirement of two years or more to meet Federal Communications Commission (FCC) requirements. In order to increase battery life, a device may enter a power saving mode when the device is idle and not performing functions that require higher power consumption. The device may be scheduled to wake up and exit the power saving mode at particular intervals to determine whether the device needs to communicate with another device, such as to report data, receive instructions, perform an update, and/or execute another type of action. Thus, when another device attempts to reach a device that is in a power saving mode, the other device may need to wait until a scheduled wake up event occurs. Furthermore, if no communication is required, the device may unnecessarily exit the power saving mode at scheduled intervals, thereby shortening the battery life.

BRIEF DESCRIPTION OF THE DRAWINGS

FIG. 13 is an exemplary signal flow diagram according to an implementation described herein.

DETAILED DESCRIPTION OF PREFERRED EMBODIMENTS

Figure 1:
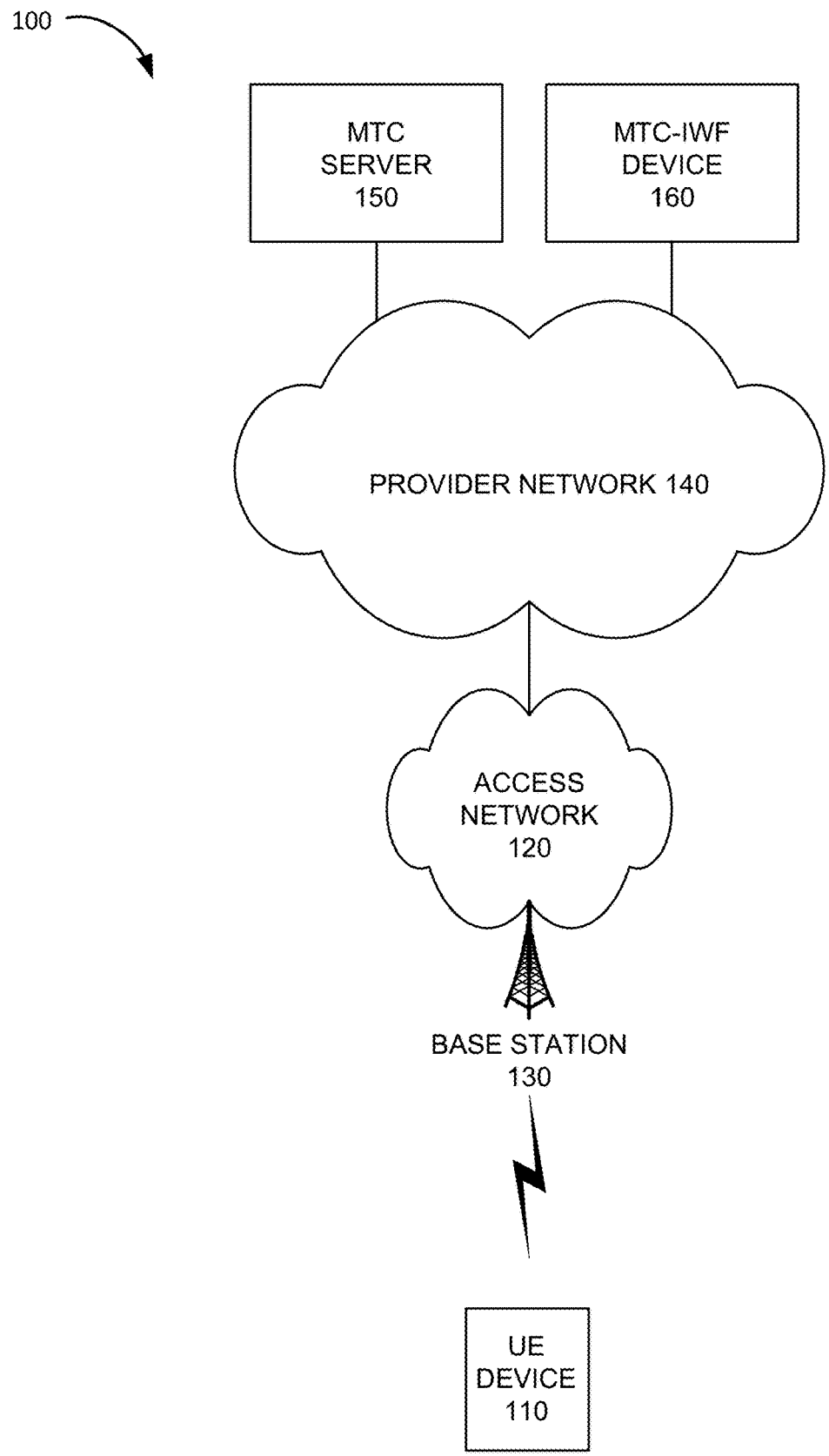
FIG. 1 is a diagram illustrating an environment according to an implementation described herein.

The following detailed description refers to the accompanying drawings. The same reference numbers in different drawings identify the same or similar elements.

A wireless communication device, also referred to herein as a user equipment (UE) device, may enter a power saving mode in order to increase battery life whenever the wireless communication device is not communicating or performing operations with high power requirements. Implementations described herein relate to a wakeup method for devices in a power saving mode. A wireless communication device may subscribe to a wireless signature beacon trigger. The wireless signature beacon trigger may be used to wake up the wireless communication device from a power saving mode when another device selects to communicate with the wireless communication device. Different groups of wireless communication devices may be configured to detect different signature beacons. A signature beacon may be configured for a wireless communication device during provisioning or during signal exchanges with a wireless access network or an MTC server device associated with the wireless communication. A wireless access network may enable an MTC server device to wake up a wireless communication device in power saving mode using the wireless signature beacon signal. A wireless signature beacon signal may be associated with a group identifier (ID), a trigger type identifier, a priority type identifier, and/or other types of identifiers. For example, particular group ID, trigger type ID, and/or priority type ID may be mapped to a particular wireless signature beacon signal.

A system architecture may be configured to deliver a wireless signature beacon to a wireless communication device to wake up the UE device. A server device may be configured to communicate with the wireless communication device and to send a wakeup signal to the wireless communication device when the server device needs to communicate with the wireless communication device. The server device may communicate with a wireless access system associated with the wireless communication device via an interface device, such as, for example, a Machine-Type Communication (MTC) Interworking Function (MTC-IWF) device. The wireless access system may include a Long Term Evolution (LTE) wireless access network. The MTC-IWF device may be configured to implement control plane signaling with devices of the wireless access network, such as a Mobility Management Entity (MME) device, a Home Subscriber Server (HSS) device, and/or another type of device.

A computer device, such as, for example, an MME device, in the wireless access network may be configured to select a broadcast method for a wakeup signal for a wireless communication device, configure a base station to broadcast the wakeup signal using the selected broadcast method, and provide information identifying the selected broadcast method to the wireless communication device. The computer device may be further configured to receive a wakeup request from an MTC-IWF device, map the received wakeup request to a wakeup signature beacon signal associated with the wireless communication device, and provide a wakeup signature beacon signal to the wireless communication device based on the received wakeup request. The mapping may include identifying a group associated with the received wakeup request, identifying a trigger type associated with the received wakeup request, and selecting the wakeup signature beacon signal based on the identified group and the identified trigger type.

The wireless signature beacon signal may include a constant amplitude zero autocorrelation waveform, such as, for example, a Zadoff-Chu sequence and/or another type of constant amplitude zero autocorrelation waveform. The trigger type may identify a particular wakeup process that instructs the wireless communication device to perform at least one of exiting a power saving mode immediately, exiting the power saving mode at a scheduled time in the future, attaching to the wireless access network, contacting a server device to request instructions, reporting a particular metric to the server device, and/or another type of action associated with a process of waking up from a power saving mode.

An HSS device of the wireless access network may be configured to store a profile for the wireless communication device that includes a wakeup request identifier and to identify the wireless communication device based on the received wakeup request including the wakeup request identifier. A base station of the wireless access network, such as, for example, an eNodeB device, may be configured to generate the wakeup signature beacon signal and transmit the generated wakeup signature beacon signal.

In some implementations, the broadcast method may include broadcasting the wireless signature beacon using a Direct Current (DC) subcarrier of a Long Term Evolution (LTE) band used by the wireless communication device for receiving wireless signals and providing the wakeup signature beacon signal to the wireless communication device may include instructing the base station to broadcast a DC subcarrier signal of the LTE band that includes the wireless signature beacon.

In other implementations, the broadcast method may include broadcasting the wakeup signature beacon signal in a physical resource block (PRB) of an LTE band and providing the wakeup signature beacon signal to the wireless communication device may include instructing the base station to broadcast a PRB that includes the wakeup signature beacon signal. For example, one or more element blocks of the PRB may each include one or more wakeup signature beacon signals. The PRB may broadcast, for example, via an LTE Physical Downlink Shared Channel (PDSCH). In yet other implementations, the broadcast method may include broadcasting the wakeup signature beacon signal in a guard band of an LTE band and providing the wakeup signature beacon signal to the wireless communication device may include instructing the base station to broadcast a signal that includes the wakeup signature beacon signal in the guard band. In yet other implementations, the wakeup signature beacon signal may be transmitted using Downlink Control Information (DCI) of a PDSCH.

In yet other implementations, the broadcast method may include broadcasting the wakeup signature beacon signal as a subcarrier signal in a subcarrier of an LTE band and providing the wakeup signature beacon signal to the wireless communication device may include instructing the base station to broadcast a subcarrier signal that includes the wakeup signature beacon signal in the subcarrier of the LTE band. For example, the subcarrier signal may have a bandwidth of approximately 3.75 kilohertz. Using a subcarrier signal with a bandwidth of 3.75 KHz may enable instructing the base station to broadcast up to 36 subcarrier signals in an LTE band, with each of the up to 36 subcarrier signals corresponding to a different wakeup signature beacon signal associated with a different group of wireless communication devices.

In some implementations, the computer device in the wireless access network may be configured to provide the information identifying the selected broadcast method in a message targeted to a particular wireless communication device, such as in a "go to sleep" message that instructs the wireless communication device to enter the power saving mode, a Radio Resource Control (RRC) message intended for the wireless communication device, and/or another type of message. In other implementations, the computer device may be configured to provide the information identifying the selected broadcast method in a broadcast message, such as System Information Block (SIB) and/or another type of broadcast message.

The wireless communication device may include a wakeup detector module configured to trigger the wireless communication device to wake up and exit the power saving mode in response to detecting the wireless signature beacon signal. In some implementations, the wakeup detector module may include a set of matched filters and a matched filter selector to select a particular matched filter. Each matched filter may be configured to detect a particular signature beacon. For example, each matched filter may be configured to detect a particular waveform sequence from a set of sequences with good auto-correlation and/or cross-correlation properties, such as a set of constant amplitude zero autocorrelation waveforms. For example, in some implementations, each matched filter may be configured to detect a Zadoff-Chu sequence with a different set of constants.

The set of matched filters may be implemented, for example, in a baseband processor of the wireless communication device. When the matched filter output exceeds a particular threshold, a wakeup signal may be generated and sent to a power manager. The power manager may be implemented, for example, in an application processor of the wireless communication device. Keeping a matched filter circuit active in the baseband processor may use a small amount of power in comparison to having the wireless communication device exit the power saving mode at particular intervals to communicate with a remote device to check for updates or instructions.

Thus, the wireless communication device may select a wakeup signature beacon signal, activate the matched circuit associated with the selected wakeup signature beacon signal, and enter a power saving mode. Activating the matched circuit may include activating a connection between the matched circuit and an antenna assembly so that wireless signals received by the antenna assembly are sent to the matched circuit. At a later time, the wireless communication may receive a wireless signature beacon signal, may determine that the received wireless signature beacon signal matches the selected wakeup signature beacon signal, and may perform a wakeup process that causes the wireless communication device to exit the power saving mode, in response to determining that the received wireless signature beacon signal matches the selected wakeup signature beacon signal.

Different signature beacons may be associated with different wake up signals. For example, a first signature beacon may be selected for a first trigger type and a second signature beacon may be selected for a second trigger type. The wireless communication device may determine a trigger type based on a detected signature beacon and may select a particular wakeup process based on the determined trigger type, such as, for example, a wakeup process to exit the power saving mode immediately, exit the power saving mode at a scheduled time in the future, attach to a wireless access network, contact a server device to request instructions, report a particular metric to the server device, and/or perform another type of action in response to the detected signature beacon.

In some implementations, the wakeup detector module may be configured to wake up at particular intervals to determine if a wakeup signature beacon signal has been received. For example, if the wakeup signature beacon signal is received from a PRB via a PDSCH, the hardware associated with the wake up detector module may need to exit a power saving mode to process the PRB to retrieve the wakeup signature beacon signal. The wakeup detector module may exit the power saving mode without the wireless communication device exiting power saving mode. In yet other implementations, wireless communication device may be configured to wake up and exit power saving mode at particular intervals to determine if a wakeup signature beacon signal has been received. For example, if the wakeup signature beacon signal is received in DCI via a PDSCH, the wireless communication device may need to perform digital signal processing to process the DCI and retrieve the wakeup signature beacon signal.

FIG. 1 is a diagram of an exemplary environment 100 in which the systems and/or methods, described herein, may be implemented. As shown in FIG. 1, environment 100 may include a UE device 110, an access network 120, a provider network 140, an MTC server 150, and an MTC-IWF device 160.

In some implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, high speed Internet access etc.), best effort data traffic, and/or other types of applications.

In other implementations, UE device 110 may include an Internet of Things (IoT) computer device enabled with wireless communication functionality and employing machine-to-machine (M2M) communication. In some implementations, the M2M communication may include MTC, a type of M2M communication standardized by the 3$^{rd}$ Generation Partnership Project (3GPP). In other implementations, the M2M communication may include a different type of communication not tied to a particular 3GPP standard. UE device 110 may include an embedded wireless MTC device that communicates wirelessly with other devices over an M2M interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

UE device 110 may include a Subscriber Identity Module (SIM) card (not shown in FIG. 1). The SIM card may store information for one or more subscriptions that may be activated for UE device 110. UE device 110 may wirelessly communicate with access network 120.

Access network 120 may provide access to provider network 140 for wireless devices, such as UE device 110. Access network 120 may enable UE device 110 to connect to provider network 140 for mobile telephone service, Short Message Service (SMS) message service, Multimedia Message Service (MMS) message service, Internet access, access to a private network, cloud computing, and/or other types of data services.

Access network 120 may establish a packet data network connection between UE device 110 and provider network 140. In some implementations, access network 120 may include a Long Term Evolution (LTE) access network (e.g., an evolved packet core (EPC) network) based on the LTE standard specified by the 3$^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 130 and UE device 110 may wirelessly communicate with access network 120 via base station 130 when UE device 110 is located within the geographic area serviced by base station 130. Base station 130 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 130) and other components and functionality that allow UE device 110 to wirelessly connect to access network 120. The eNodeB base station device may include or be associated with one or more cells. For example, each cell may include a radio frequency (RF) transceiver facing a particular direction. The eNodeB base station device may correspond to a macrocell or to a small cell (e.g., a femtocell, a picocell, a microcell, etc.).

Provider network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 140 may allow the delivery of Internet Protocol (IP) services to UE device 110, and may interface with other external networks. Provider network 140 may include one or more server devices and/or network devices, or other types of computation or communication devices. In some implementations, provider network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

MTC server 150 may include one or more devices, such as computer devices and/or server devices, which communicate with UE device 110. MTC server 150 may generate a wakeup signal to wake up UE device 110 and may send the wake up signal to MTC-IWF device 160. After UE device 110 has woken up, MTC server 150 may communicate with UE device 110 to provide instructions to UE device 110 and/or to receive information from UE device 110. As an example, if UE device 110 corresponds to a mobile communication device with an installed application, MTC server 150 may correspond to a server device associated with the installed application. As another example, if UE device 110 corresponds to a utility meter, MTC server 150 may correspond to a utility server device that collects meter readings from the utility meter. As yet another example, if UE device 110 corresponds to a personal medical device, MTC server 150 may correspond to a server device that monitor's a user's vital signs.

MTC-IWF device 160 may include one or more devices, such as computer devices and/or server devices, which function as an interface device between MTC server 150 and access network 120. For example, MTC-IWF device 160 may implement a control plane interface with elements of access network 120 and may generate and transmit a request message, such as a request to authenticate UE device 110 and/or a request to wake up UE device 110, to a particular element of access network 120 based on a request received from MTC server 150. MTC-IWF device 160 may receive an indication from access network 120 that UE device 110 has woken up and is ready for communicating with MTC server 150 and may inform MTC server 150 that UE device 110 has woken up and is ready for communication.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
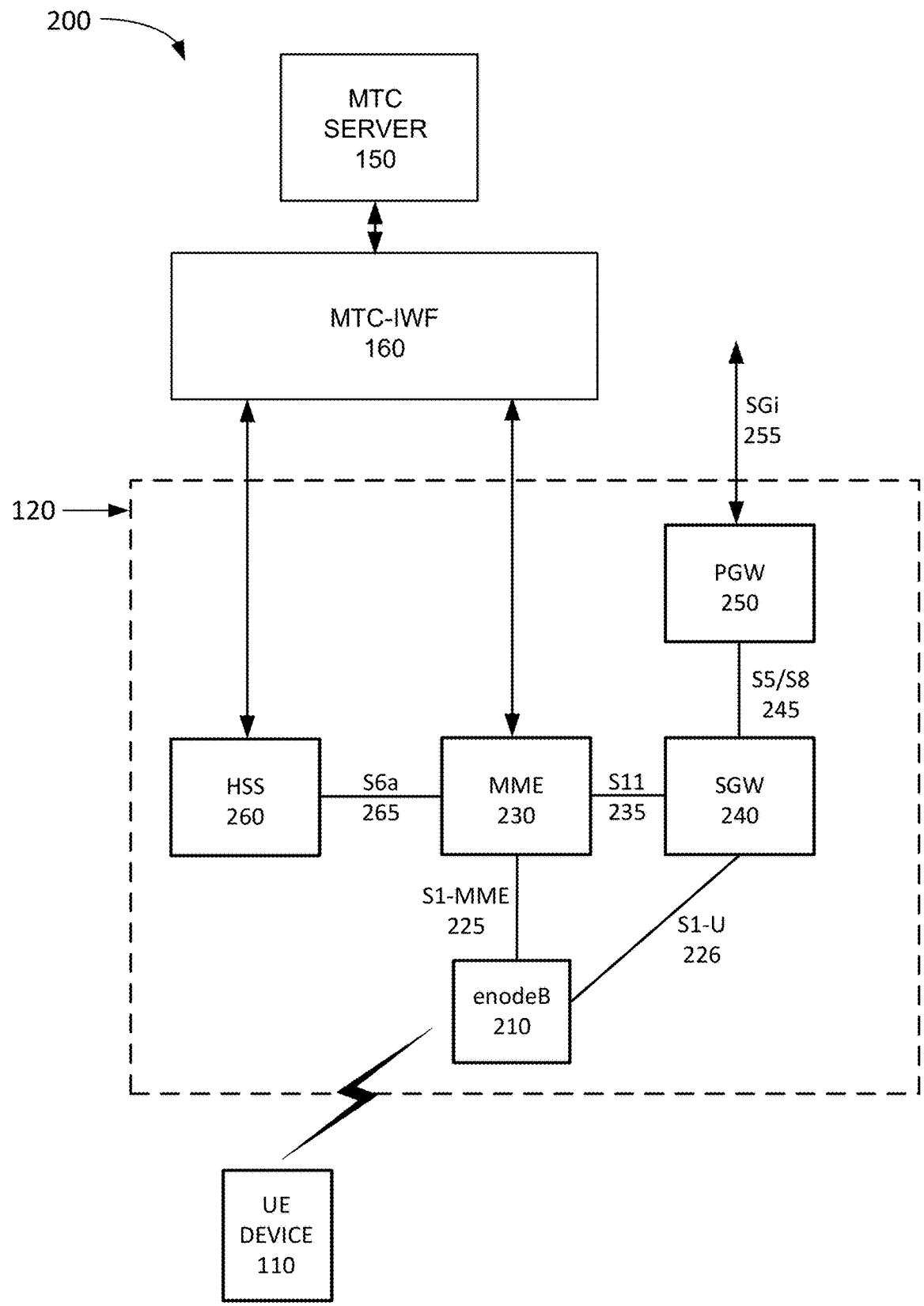
FIG. 2 is a diagram illustrating exemplary components of the access network of FIG. 1.

FIG. 2 is a diagram illustrating example components of a system 200 that includes access network 120 according to an implementation described herein. As shown in FIG. 2, system 200 may include access network 120, MTC server 150, and MTC-IWF device 160. Access network 120 may correspond to a Long Term Evolution (LTE) access network. Access network 120 may include one or more devices that implement logical entities interconnected via standardized interfaces, and that provide wireless packet-switched services and wireless IP connectivity to user devices for both data and voice services. Access network 120 may include eNodeB 210 (corresponding to base station 130), a mobility management entity (MME) 230, a serving gateway (SGW) 240, a packet data network gateway (PGW) 250, and a home subscriber server (HSS) 260. While FIG. 2 depicts a single eNodeB 210, MME 230, SGW 240, PGW 250, and HSS 260 for illustration purposes, in other implementations FIG. 2 may include multiple eNodeBs 210, MME 230, SGWs 240, PGWs 250, and/or HSS 260.

eNodeB 210 may include one or more devices (e.g., base stations) and other components and functionality that allow UE device 110 to wirelessly connect to access network 120. eNodeB 210 may interface with access network 120 via an interface referred to as an S1 interface, which may be split into a control plane S1-MME interface 225 and a data place S1-U interface 226. S1-MME interface 225 may interface with MME 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME 230 may implement control plane processing for access network 120. For example, MME 230 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 230 may also select a particular SGW 240 for a particular UE device 110. A particular MME 230 may interface with other MME 230 in access network 120 and may send and receive information associated with UEs, which may allow one MME 230 to take over control plane processing of UEs serviced by another MME, if the other MME becomes unavailable.

SGW 240 may provide an access point to and from UE device 110, may handle forwarding of data packets for UE device 110, and may act as a local anchor point during handover procedures between eNodeBs 210. SGW 240 may interface with PGW 250 through an S5/S8 interface 245. S5/S8 interface 245 may be implemented, for example, using GTPv2.

PGW 250 may function as a gateway to provider network 140 through an SGi interface 255. Provider network 140 may include, for example, an IMS network, which may provide voice and multimedia services to UE device 110, based on Session Initiation Protocol (SIP). A particular UE device 110, while connected to a single SGW 240, may be connected to multiple PGWs 250, one for each packet network with which UE device 110 communicates.

MME 230 may communicate with SGW 240 through an S11 interface 235. S11 interface 235 may be implemented, for example, using GTPv2. S11 interface 235 may be used to create and manage a new session for a particular UE device 110. S11 interface 235 may be activated when MME 230 needs to communicate with SGW 240, such as when the particular UE device 110 attaches to access network 120, when bearers need to be added or modified for an existing session for the particular UE device 110, when a connection to a new PGW 250 needs to be created, or during a handover procedure (e.g., when the particular UE device 110 needs to switch to a different SGW 240).

HSS 260 may store information associated with UE devices 110 and/or information associated with users of UE devices 110. For example, HSS 260 may store user profiles that include authentication and access authorization information. HSS 260 may store subscription status information for SIM cards associated with UE devices 110. MME 230 may communicate with HSS 260 through an S6a interface 265. S6a interface 265 may be implemented, for example, using a Diameter protocol.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120.

Figure 3:
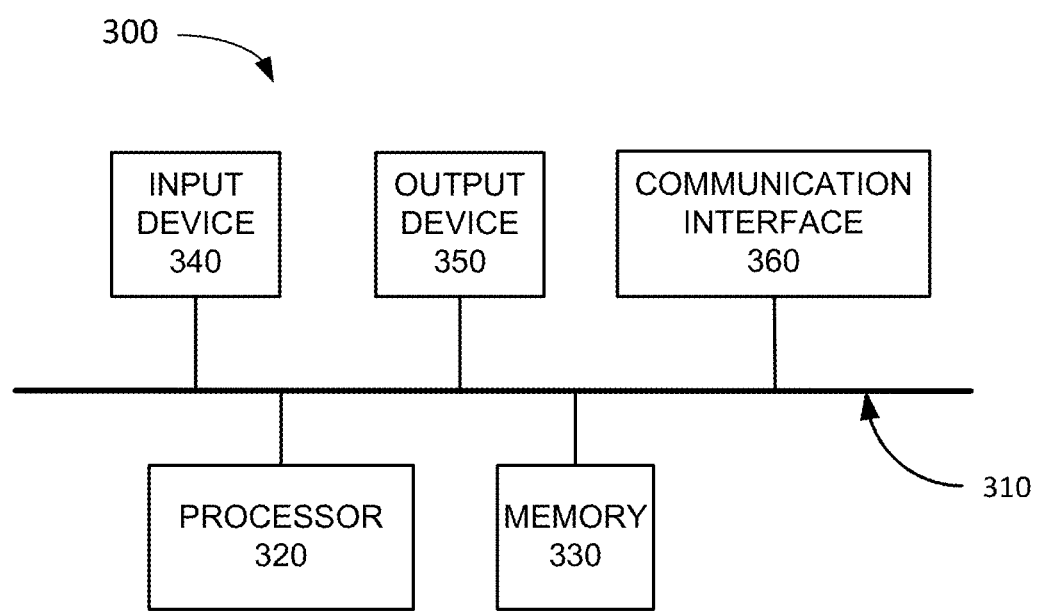
FIG. 3 is a diagram illustrating exemplary components of one or more of the devices of FIG. 1 or FIG. 2.

FIG. 3 is a diagram illustrating exemplary components of device 300 according to an implementation described herein. UE device 110, MTC server 150, MTC-IWF device 160, eNodeB 210, MME 230, SGW 240, PGW 250, and/or HSS 260 (and other devices in environment 100) may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. For example, processor 320 may include one or more Central Processing Units (CPUs) and/or one or more Graphics Processing Units (GPU). In other embodiments, processor 320 may include an application-specific integrated circuit (ASIC), a field-programmable gate array (FPGA), and/or another type of integrated circuit or processing logic. Processor 320 may control operation of device 300 and its components.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300 and/or to collect information from the environment using one or more sensors. Input device 340 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 300 may be managed remotely and may not include input device 340. In other words, device 300 may be "headless" and may not include a keyboard, for example.

Output device 350 may output information to an operator of device 300 and/or to control device 300 and/or the environment using one or more actuators. Output device 350 may include a display, a printer, a speaker, an illumination source (e.g., a camera flash), an actuator to cause device 300 to vibrate, a motor to cause part of device 300 to move, a lock device, and/or another type of output device. For example, device 300 may include a display, which may include a liquid-crystal display (LCD), a light emitting diode (LED) display, an organic LED (OLED) display, an electrophoretic (e.g., electronic ink) display, and/or another type of display device for displaying content to the customer. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals. For example, if device 300 is included in UE device 110 or eNodeB 210, communication interface 360 may include an antenna assembly that includes one or more antennas to transmit and/or receive RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 300 may perform certain operations relating to a method of waking up UE device 110 from a power saving mode. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
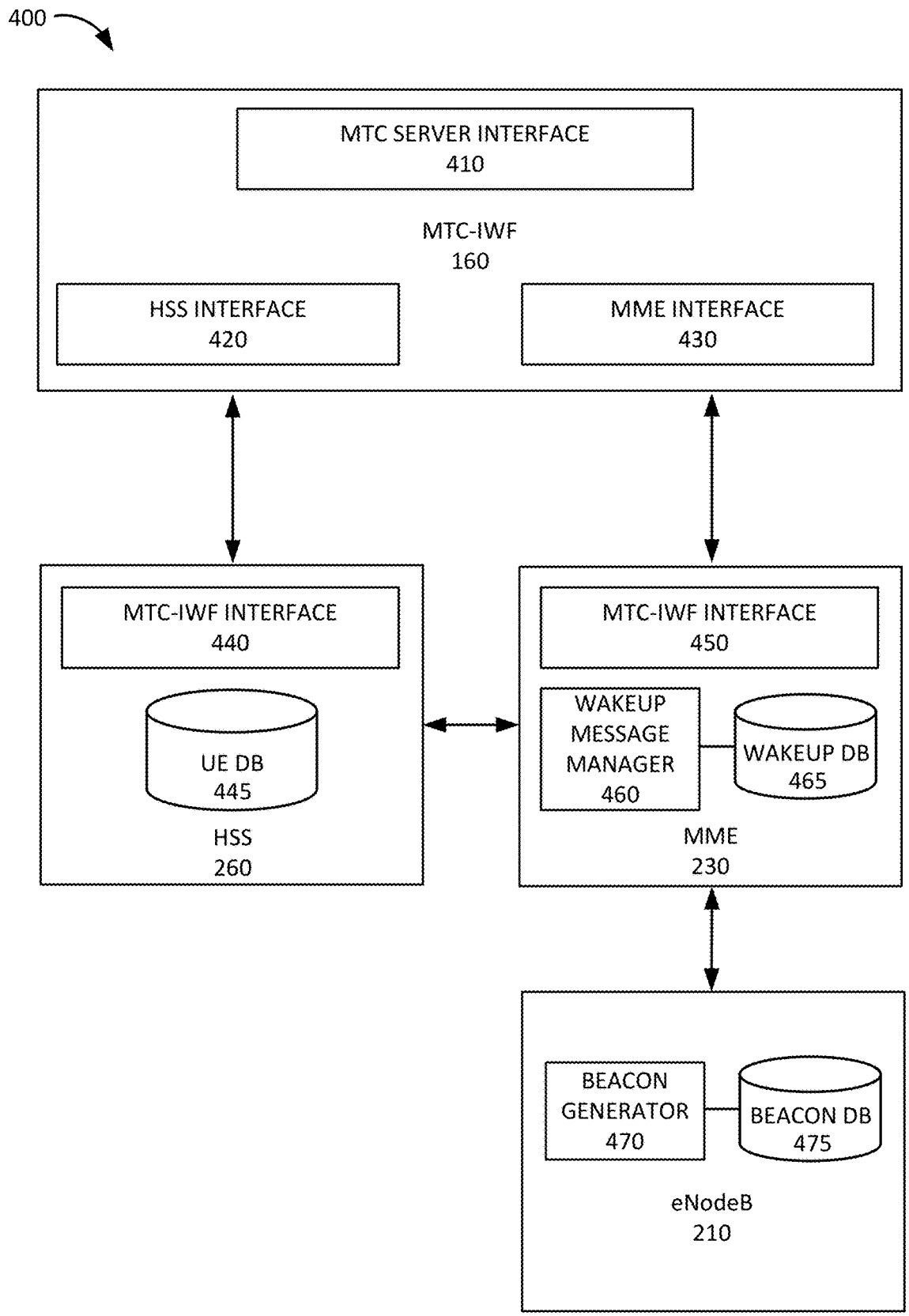
FIG. 4 is a diagram illustrating exemplary functional components of some of the devices of FIG. 2.

FIG. 4 is a diagram illustrating system 400 that includes exemplary functional components of MTC-IWF device 160, HSS 260, MME 230, and eNodeB 210. The functional components of MTC-IWF device 160, eNodeB 210, HSS 260, and/or MME 230 may be implemented, for example, via processor 320 executing instructions from memory 330. Alternatively, some or all of the functional components included in system 400 may be implemented via hard-wired circuitry. As shown in FIG. 4, MTC-IWF device 160 may include an MTC server interface 410, an HSS interface 420, and an MME interface 430. MTC server interface 410 may be configured to communicate with MTC server 150. MTC server interface 410 may receive a wakeup request from MTC server 150 and may forward the wakeup request to HSS interface 420. HSS interface 420 may be configured to communicate with HSS 260. HSS interface 420 may send a request to HSS 260 to determine one or more UE devices 110 associated with the wakeup request and/or to determine to which MME 230 to send the wakeup request.

As shown in FIG. 4, HSS 260 may include an MTC-IWF interface 440 and a UE database (DB) 445. MTC-IWF interface 440 may be configured to communicate with MTC-IWF device 160. UE DB 445 may store UE profiles for UE devices 110. MTC-IWF interface 440 may receive a wakeup request from MTC-IWF device 160 and may determine one or more UE devices 110 associated with the wakeup request based on a wakeup group identifier included in the wakeup request. HSS 260 may be configured for beacon trigger service for a UE subscription group. If UE device 110 is added to the subscription group, HSS 260 may add a wakeup request group identifier (ID) to a profile for UE device 110. Furthermore, UE profile of UE device 110 may identify a particular MME 230 associated with UE device 110. Thus, MTC-IWF interface 440 may respond to the request from MTC-IWF device 160 by identifying one or more UE devices 110 associated with the wakeup request, and/or may identify one or more MMEs 230 associated with the identified one or more UE devices 110, based on information stored in UE profiles in UE DB 445, and may provide identified information to MTC-IWF device 160.

MME interface 430 of MTC-IWF device 160 may be configured to communicate with MIME 230. MME interface 430 may send a request to one or more MMEs 230 based on a wakeup request received from MTC server interface 410 and based on information received via HSS interface 420.

As shown in FIG. 4, MME 230 may include a MTC-IWF interface 450, a wakeup message manager 460, and a wakeup DB 465. MTC-IWF interface 450 may be configured to communicate with MTC-IWF device 160. For example, MTC-IWF interface 450 may receive a wakeup request from MTC-IWF device 160 and may forward the request to wakeup message manager 460. Wakeup message manager 460 may map the wakeup request to a signature beacon based on information stored in wakeup DB 465. Wakeup DB 465 may associate a particular wakeup request group ID, a particular trigger type ID, a particular priority ID, and/or other identifiers with a particular signature beacon ID. Wakeup message manager 460 may identify one or more eNodeBs 210 serving UE devices 110 associated with the wakeup request group ID included in the received wakeup request and may instruct the identified eNodeBs 210 to generate signature beacons associated with the mapped signature beacon ID.

As shown in FIG. 4, eNodeB 210 may include a beacon generator 470 and a beacon DB 475. Beacon generator 470 may be configured to generate a particular beacon from a set of sequences with good auto-correlation and/or cross-correlation properties. For example, beacon generator 470 may be configured to generate waveforms based on Zadoff-Chu sequences. Beacon DB 475 may associate particular signature beacon IDs with particular parameters for generating a particular signature beacon waveform. eNodeB 210 may wirelessly transmit the generated signature beacon.

Although FIG. 4 shows exemplary components of system 400, in other implementations, system 400 may include fewer components, different components, additional components, or differently arranged components than depicted in FIG. 4. Additionally or alternatively, one or more components of system 400 may perform one or more tasks described as being performed by one or more other components of system 400.

Figure 5A:
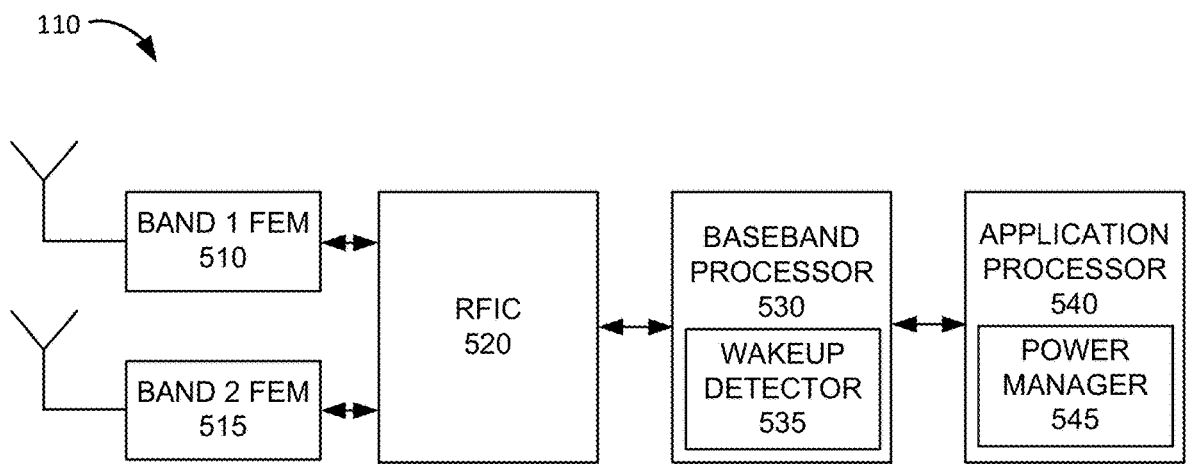
FIGS. 5A and 5B are diagrams illustrating exemplary functional components of the user equipment device of FIG. 1.

FIG. 5A is a diagram illustrating exemplary functional components of UE device 110 according to an implementation described herein. The functional components of UE device 110 may be implemented, for example, via processor 320 executing instructions from memory 330. Alternatively, some or all of the functional components of UE device 110 may be implemented via hard-wired circuitry. As shown in FIG. 5A, UE device 110 may include a band 1 front end module (FEM) 510 with a corresponding antenna and a band 2 FEM 515 with a corresponding antenna, a radio frequency integrated circuit (RFIC) 520, a baseband processor 530, and an application processor 540.

FEM 510 may process a signal received at a first incoming frequency in a first band and FEM 515 may process a signal received at a second incoming frequency in a second band. FEM 510 and FEM 515 may include, for example, an impedance matching circuit to match the input impedance of the receiving circuit to the impedance of the antenna, an amplifier to amplify received signals, and/or a mixer to mix incoming signals with signals from a local oscillator to convert the received signals to an intermediate frequency. RFIC 520 may include an integrated circuit to down convert signals from an intermediate frequency to a baseband frequency.

Baseband processor 530 may perform real-time processing on received signals, or signals which are to be transmitted, such as signal modulation/demodulation, encoding, RF shifting, error correction, and/or other types of baseband operations. Baseband processor 530 may include a wakeup detector 535. Wakeup detector 535 may monitor incoming signals for a matching wireless signature beacon. If a matching wireless signature beacon is detected, wakeup detector 535 may generate a wakeup signal and may send the wakeup signal to application processor 540. Exemplary components of wakeup detector 535 are described below with reference to FIG. 5B.

Application processor 540 may perform the main operations of UE device 110. For example, application processor 540 may run an operating system and may run applications installed on UE device 110. Application processor 540 may include a power manager 545. Power manager 545 may manage the power settings of UE device 110. For example, power manager 545 may be configured to maximize the battery life of UE device 110. Thus, when UE device 110 is not performing a particular task, such as running an application or communicating with MTC server 150, power manager 545 may cause UE device 110 to enter a power saving mode. The power saving mode may reduce or halt devices or processes associated with UE device 110, such as for example, causing processing cores to enter an idle mode; shutting down or reducing or eliminating power flow to output devices, communication devices and/or transitory memory devices; terminating particular applications and/or process threads; and/or performing other tasks to extend the battery life of UE device 110.

Power manager 545 may cause UE device 110 to exit the power saving mode in response to receiving a wakeup signal from wakeup detector 535. Different signature beacons may cause wakeup detector 535 to generate different types of wakeup signals and different types of wakeup signals may cause power manager 545 to perform different actions. Thus, power manager 545 may map particular wakeup signals to a particular sets of actions. For example, power manager 545 may perform a wakeup process to exit the power saving mode immediately, to exit the power saving mode at a scheduled time in the future, to attach or re-attach to a access network 120, to contact MTC server device 150 to request instructions and/or updates, to send a particular piece of information to MTC server device 150, and/or perform another type of action.

Figure 5B:
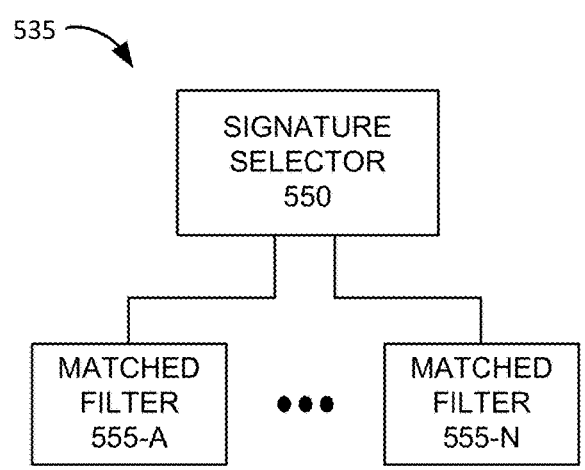

FIG. 5B shows exemplary components of wakeup detector 535 of FIG. 5A according to some implementations described herein. As shown in FIG. 5B, wakeup detector 535 may include a signature selector 550 and a set of matched filters 555-A to 555-N. Signature selector 550 may select a particular one of matched filters 555 and may activate the selected matched filter 555.

Matched filter 555 may correspond to a linear filter that correlates a template signal waveform with a received signal to detect the presence of the template signal waveform in the received signal. If the template signal waveform is present in the received signal, matched filter 555 may generate an output impulse signal. Each matched filter 555 may be configured to detect a particular signature beacon. For example, each matched filter 555 may be configured to detect a signal waveform from a set of sequences with good auto-correlation and/or cross-correlation properties, such as a particular Zadoff-Chu sequence, a particular M sequence, and/or another type of sequence. An exemplary waveform sequence is described below with reference to FIG. 7B.

A particular one of matched filters 555 may be active at a particular time, based on which matched filter 555 is assigned to UE device 110 and consequently selected by signature selector 550. For example, in some implementations, signature selector 550 may direct signals received by baseband processor 530 to the selected matched filter 555. In other implementations, signals may be directed to multiple matched filters 555 and coefficients for a weighted sum of outputs of matched filters 555 may be selected based on the selected matched filter. For example, the output of wakeup detector 535 may be based on an equation $y(n)=a_1*x(1)+ \ldots +a_n*x(n)$, where $a_u$ represents the coefficient for matched filter u, where x(u) represents the output of matched filter u, and where n represents the number of matched filters. In yet other implementations, multiple matched filters 555 may be selected for different trigger types, different priorities, etc.

Although FIGS. 5A and 5B show exemplary functional components of UE device 110, in other implementations, UE device 110 may include fewer functional components, different functional components, differently arranged functional components, or additional functional components than depicted in FIGS. 5A and 5B. Additionally or alternatively, one or more functional components of UE device 110 may perform functions described as being performed by one or more other functional components of UE device 110. For example, in implementations in which a wakeup signature beacon signal is sent in a PRB of a PDSCH, wakeup detector 535 may exit a power saving mode, without other components of UE device 110 exiting the power saving mode, to process the PRB to retrieve the wakeup signature beacon signal.

Figure 6A:
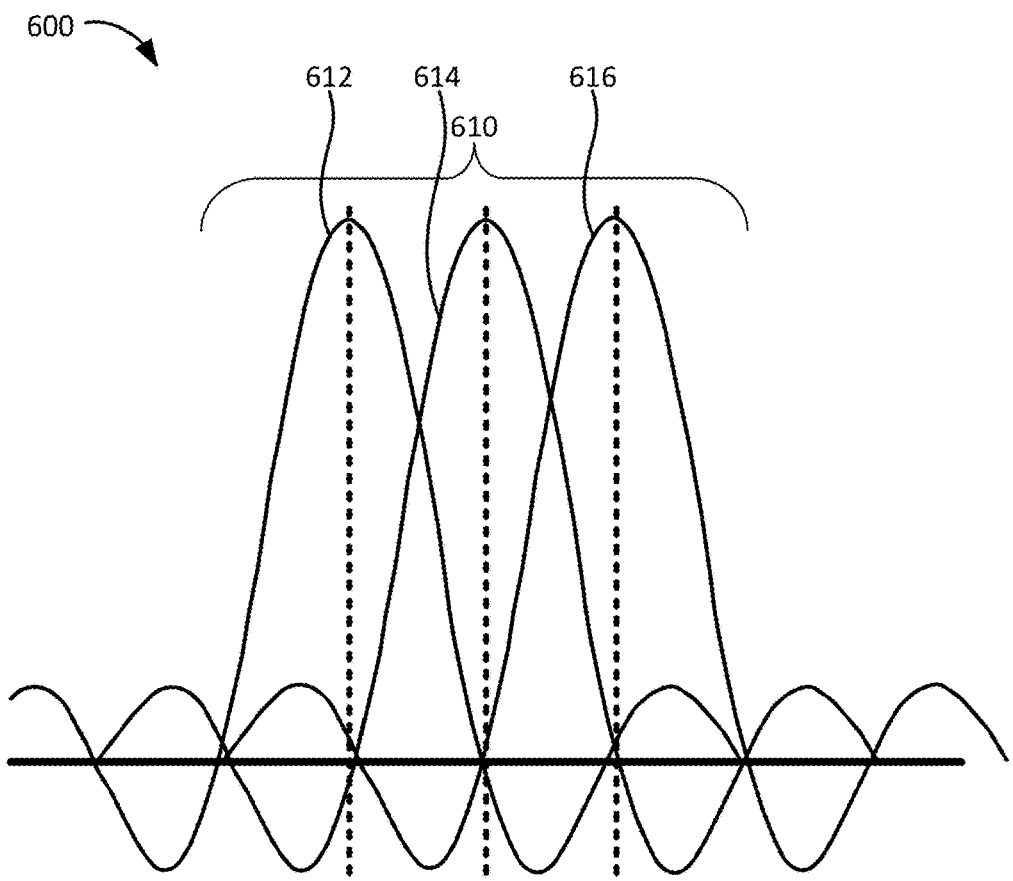
FIGS. 6A, 6B, and 6C are diagrams illustrating exemplary channel structures according to an implementation described herein.
Figure 6B:
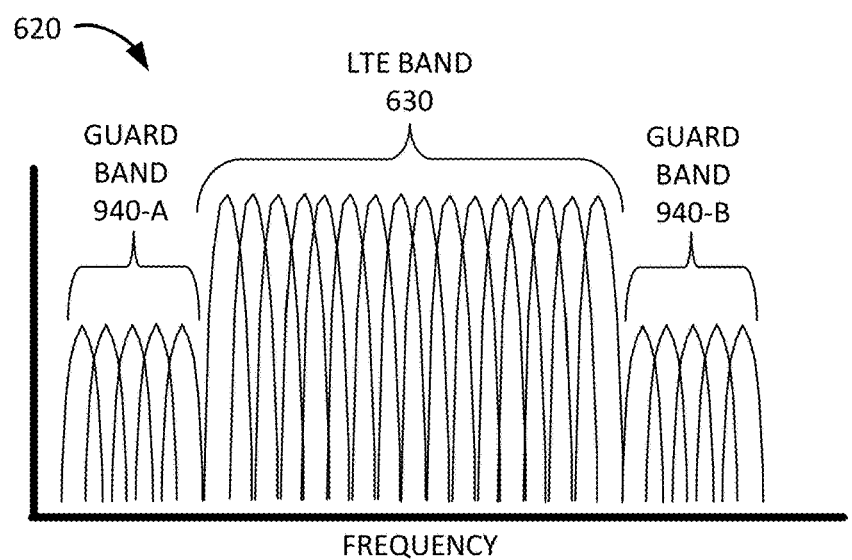
Figure 6C:
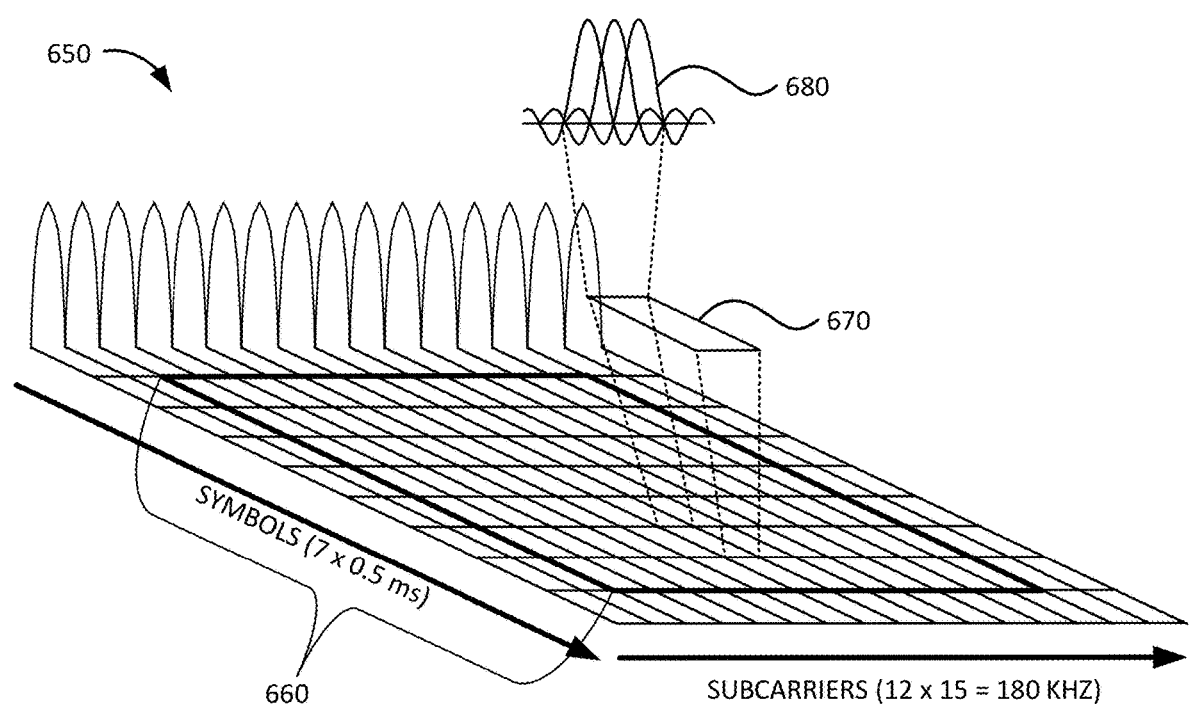

FIGS. 6A, 6B, and 6C are diagrams illustrating exemplary channel structures according to an implementation described herein. FIG. 6A is diagram illustrating a channel structure 600 that includes a subcarrier signal 610 of an LTE carrier signal. Subcarrier signal 610 may include a first subcarrier signal 612, a second subcarrier signal 614, and a third subcarrier signal 616. First subcarrier signal 612, second subcarrier signal 614, and third subcarrier signal 616 may each include a wakeup signature beacon signal associated with a different group of UE devices 110 and/or associated with a different trigger type. For example, subcarrier signal 610 may correspond to a 15 KHz LTE subcarrier signal and first subcarrier signal 612, second subcarrier signal 614, and third subcarrier signal 616 may each correspond to a 3.75 KHz Zadoff-Chu sequence wakeup signature beacon signal.

FIG. 6B is a diagram illustrating a channel structure 620 that includes an LTE band 630, a first guard band 940-A, and a second guard band 940-B. First guard 940-A may be located below LTE band 630 and second guard band 940-B may be located above LTE band 630 on the frequency spectrum. First guard band 940-A and second guard band 940-B may separate LTE band 930 from other bands used for communication. One or both of first guard band 940-A and second guard band 940-B may include one or more wakeup signature beacon signals. For example, first guard band 940-A may include one or more of first subcarrier signal 612, second subcarrier signal 614, and third subcarrier signal 616 of FIG. 6A.

FIG. 6C is a diagram illustrating a channel structure 650 that includes a PRB 660 of a 180 KHz LTE band. PRB 660 may include 12 subcarriers and 7 symbols. Thus, PRB 660 may include 7×12=84 block elements 670. Each block element 670 may include one symbol carried by one 15 KHz subcarrier. As shown in FIG. 6C, a particular block element 670 may include channel structure 680 that includes three 3.75 KHz subcarriers (e.g., first subcarrier signal 612, second subcarrier signal 614, and third subcarrier signal 616 of FIG. 6A). Each 3.75 KHz subcarrier may include a wakeup signature beacon signal associated with a different group of UE devices 110 and/or associated with a different trigger type. Thus, up to 12×3=36 wakeup signature beacon signals may be carried in a PRB during one symbol time slot. However, any number of the 12 subcarriers may be designated for carrying wakeup signature beacon signals in a particular implementation.

Figure 7A:
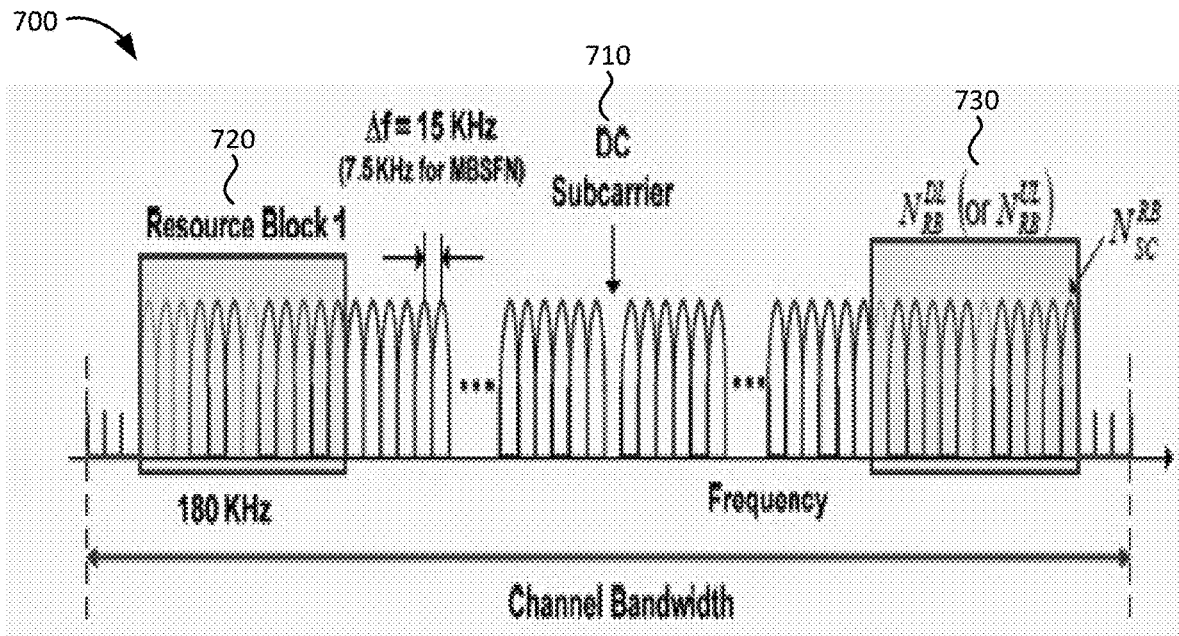
FIG. 7A is a diagram of an exemplary channel according to an implementation described herein.

FIG. 7A is a diagram of another exemplary channel structure 700 according to an implementation described herein. As shown in FIG. 7A, channel structure 700 may include an Orthogonal Frequency Division Multiplexing (OFDM) channel that is divided into multiple subcarriers that carry information. Channel structure 700 may include a DC subcarrier 710 and data subcarriers 720 and 730. Though channel structure 700 may include a larger number of data subcarriers, only subcarriers 720 and 730 are shown in FIG. 7A for illustrative purposes. DC subcarrier 710 may include a frequency range corresponding to the RF center frequency of the transmitted signal. Thus, DC subcarrier 710 may correspond to the zero frequency (i.e., direct current) of the unmodulated Fast Fourier Transform (FFT) signal of the transmission. Because the DC subcarrier may experience a high level of noise, DC subcarrier 710 may be designated to not carry any data (e.g., resource blocks) in an LTE wireless communication. Thus, DC subcarrier 710 may be available to carry a signature beacon to wake up UE device 110 in a power saving mode. The signature beacon waveform may be of a short duration and transmitted repeatedly and may thus not be affected by a higher signal-to-noise (SNR) ratio experienced by DC subcarrier 710.

Figure 7B:
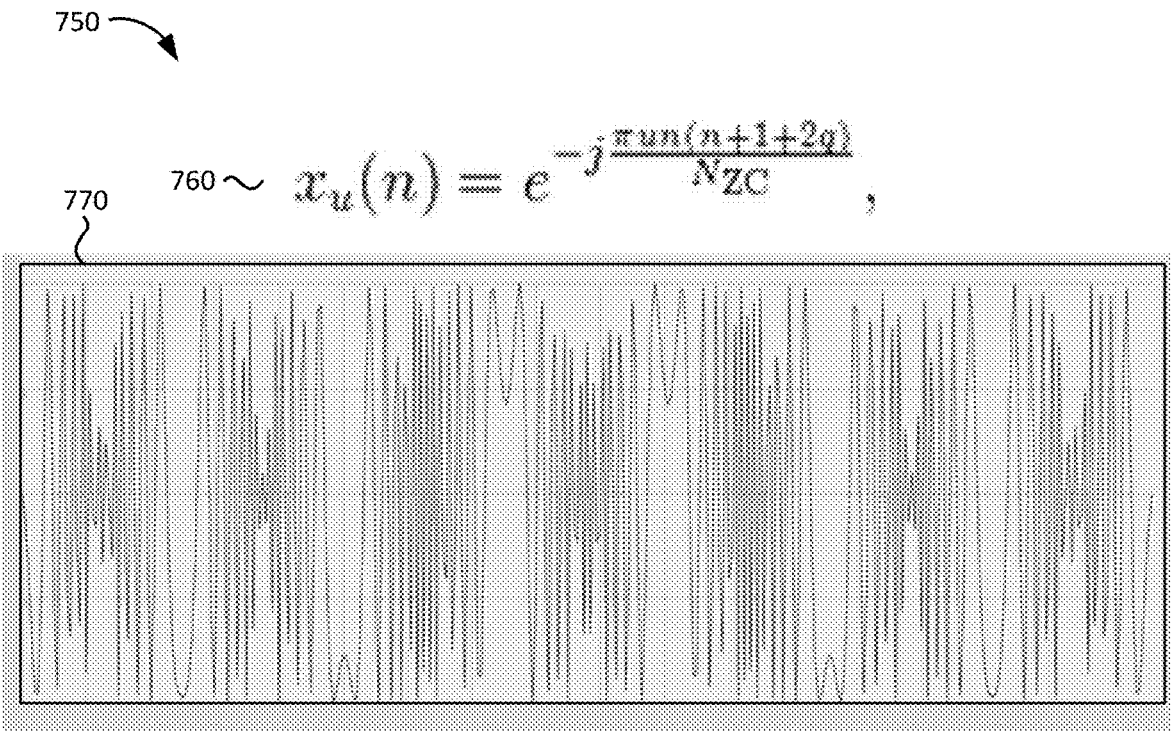
FIG. 7B is a diagram of an exemplary signature beacon according to an implementation described herein.

FIG. 7B is a diagram of an exemplary signature beacon waveform 750 according to an implementation described herein. As shown in FIG. 7B, signature beacon waveform 750 of amplitude over time may be based on a Zadoff-Chu sequence 760. In Zadoff-Chu sequence 760, the complex value at each position n of a root parametrized by u is defined by equation:

$$x_u(n) = e^{-j\frac{\pi u n(n+1+2q)}{N_{ZC}}}$$

wherein q corresponds to an integer constant, $N_{ZC}$ corresponds to a constant that represents the length of the sequence, and wherein n is a value between 0 and $N_{ZC}$. A Zadoff-Chu sequence, when applied to a radio signal, may generate a signal of a constant amplitude with cyclically shifted versions resulting in zero correlation with one another. An exemplary waveform 770 for a Zadoff-Chu sequence with u=7 and N=353 is shown in FIG. 7B.

Figure 8:
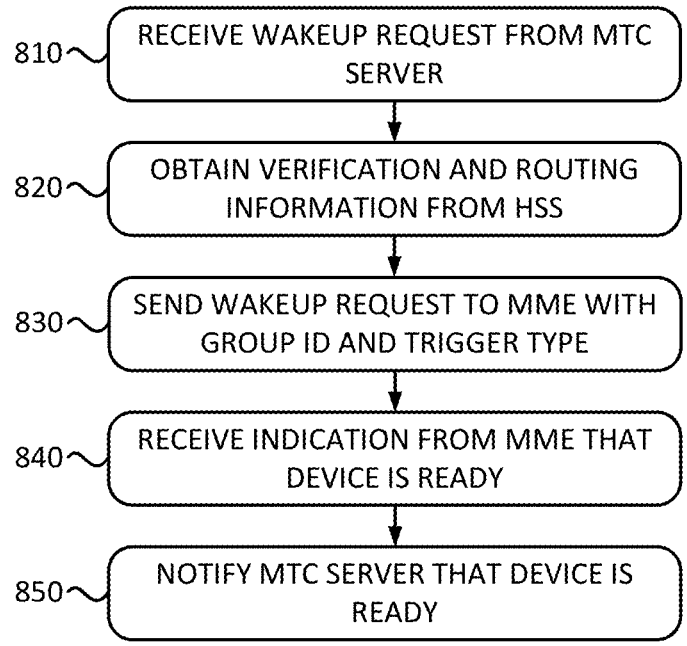
FIG. 8 is a flowchart of an exemplary process performed by a machine type communication interworking function (MTC-IWF) device according to an implementation described herein.

FIG. 8 is a flowchart of an exemplary process performed by MTC-IWF device 160 according to an implementation described herein. In some implementations, the process of FIG. 8 may be performed by MTC-IWF device 160. In other implementations, some or all of the process of FIG. 8 may be performed by another device or a group of devices separate from MTC-IWF device 160 or including MTC-IWF device 160.

The process of FIG. 8 may include receiving a wakeup request from an MTC server (block 810). For example, MTC-IWF device 160 may receive a request from MTC server 150 to wake up a device or a group of devices associated with MTC server 150 in order to update, check the status of, obtain information from, or otherwise communicate with the device or group of devices. The request may include a wakeup group ID and additional information, such as a trigger type, a priority type, and/or other types of information. Verification and routing information may be obtained from an HSS device (block 820). For example, MTC-IWF device 160 may send a request to HSS 260 to authenticate MTC server 150 and to determine which UE devices 110 are subscribed to the wakeup group ID and which MMES 230 are associated with the UE devices 110. MTC-IWF device 160 may receive a response from HSS 260 that includes the requested information.

A wakeup request to one or more MMES may be sent with the group ID and the trigger type (block 830). For example, MTC-IWF device 160 may send a wakeup request to one or more MMES 230 associated with the identified UE devices 110 subscribed to the wakeup group ID. The wakeup request may include the wakeup group ID, a trigger type identifying a type of wakeup event, and/or other information, such as, for example, a priority type associated with the wakeup request.

An indication may be received from an MME that a device is ready (block 840) and the MTC server may be notified that the device is ready (block 850). For example, MTC-IWF device 160 may receive an indication from MME 230 that a UE device 110 has woken up and/or that the UE device 110 has attached or re-attached to access network 120 and that UE device 110 is ready to communicate with MTC server 150. MTC-IWF device 160 may send an indication to MTC server 150 that UE device 110 is ready to communicate with MTC server 150.

Figure 9:
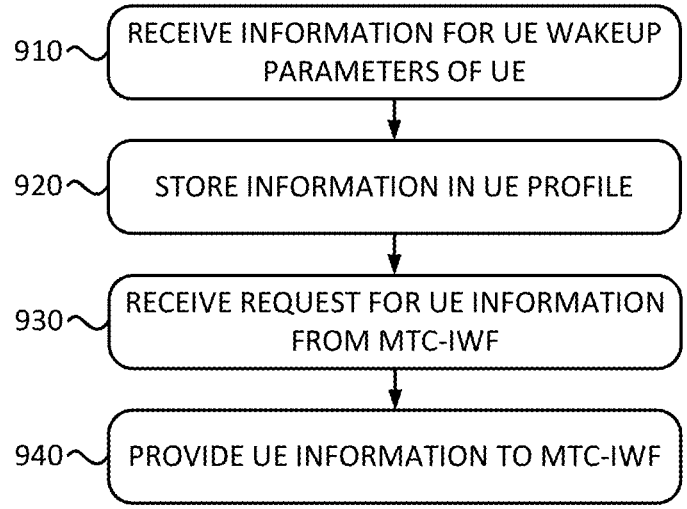
FIG. 9 is a flowchart of an exemplary process performed by a Home Subscriber Server (HSS) according to an implementation described herein.

FIG. 9 is a flowchart of an exemplary process performed by HSS 260 according to an implementation described herein. In some implementations, the process of FIG. 9 may be performed by HSS 260. In other implementations, some or all of the process of FIG. 9 may be performed by another device or a group of devices separate from HSS 260 or including HSS 260.

The process of FIG. 9 may include receiving information for UE wakeup parameters of a UE (block 910) and storing the received information in a UE profile (block 920). For example, UE device 110 may subscribe to a particular wakeup group. The subscription request may be received from UE device 110, from MTC server 150, and/or from another device. In response, HSS 260 may update UE record for UE device 110 to include a wakeup signature beacon trigger service and may identify UE device 110 as being a member of the wakeup group by including the wakeup group ID in the UE profile. Moreover, HSS 260 may associate MTC server 150 with UE device 110 by including information identifying MTC server 150, and/or authentication information for MTC server 150, in UE DB 445. For example, UE DB 445 may include wakeup group records for each wakeup group ID and a wakeup group record may include information identifying MTC server 150 and/or authentication information for MTC server 150. Furthermore, HSS 260 may maintain information relating to which particular MME 230 is servicing UE device 110.

A request for UE information may be received from an MTC-IWF device (block 930) and the UE information may be provided to the MTC-IWF device (block 940). For example, HSS 260 may receive a request from MTC-IWF device 260 to authenticate MTC server 150 and to provide information identifying UE devices 110 associated with a wakeup group ID, as well as information identifying MMES 230 serving the identified UE devices 110. HSS 260 may access UE DB 445 to obtain the requested information and may provide the requested information to MTC-IWF device 160.

Figure 10:
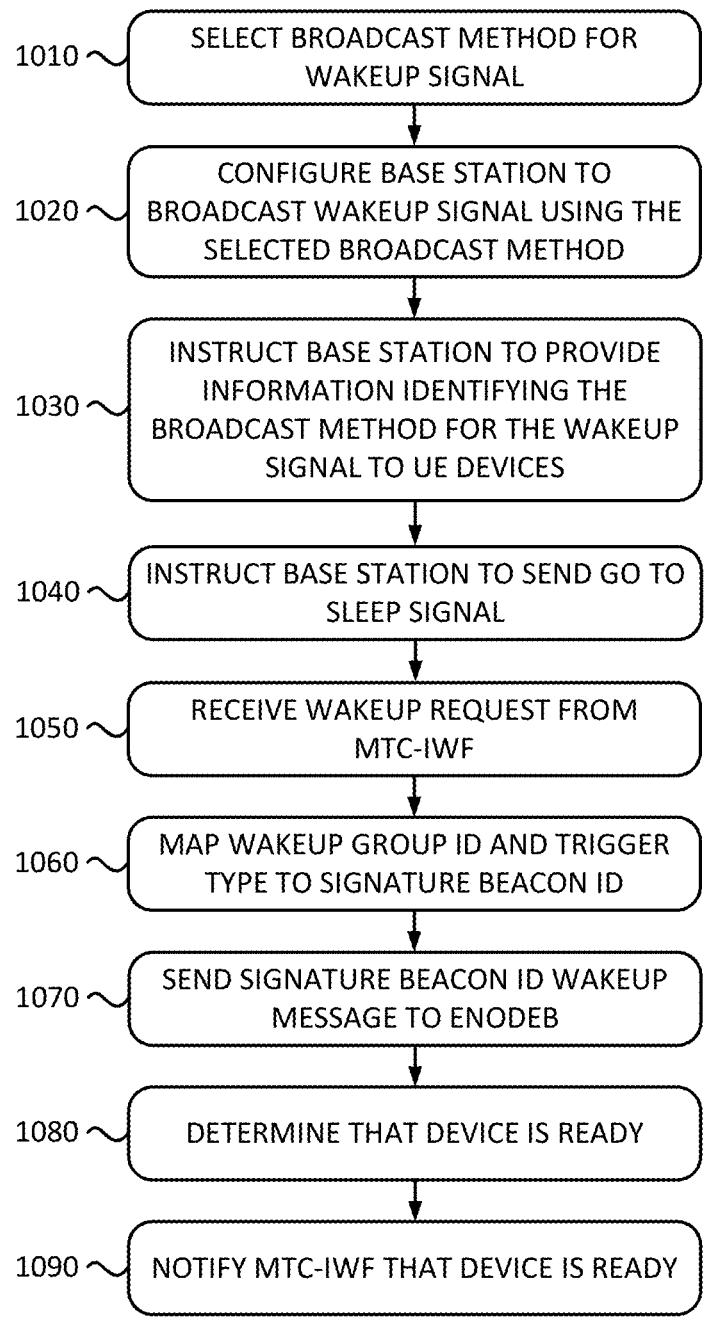
FIG. 10 is a flowchart of an exemplary process performed by a Mobility Management Entity (MME) according to an implementation described herein.

FIG. 10 is a flowchart of an exemplary process performed by MME 230 according to an implementation described herein. In some implementations, the process of FIG. 10 may be performed by MME 230. In other implementations, some or all of the process of FIG. 10 may be performed by another device or a group of devices separate from MME 230 or including MME 230.

The process of FIG. 10 may include selecting a broadcast method for a wakeup signal (block 1010) and configuring or instructing a base station to broadcast a wakeup signal using the selected broadcast method (block 1020). MME 230 may select a particular channel structure and/or channel location for transmitting a wakeup signature beacon signal and instruct eNodeB 210 to use the selected channel structure and/or channel location. For example, wakeup message manager 460 may select to instruct eNodeB 210 to transmit a wakeup signature beacon signal in a DC subcarrier signal of an LTE band, to transmit a wakeup signature beacon signal in a guard band of an LTE band, to transmit a wakeup signature beacon signal in a PRB in an LTE band, and/or to transmit a wakeup signature beacon using a different technique. Furthermore, wakeup message manager 460 may select to instruct eNodeB 210 to transmit a wakeup signature beacon signal as 180 KHz PRB signal, as a single channel (e.g., a 10 KHz channel) in a 15 KHz subcarrier (e.g., in a guard band, in a PRB, etc.), as one or more subcarriers in an LTE subcarrier signal (e.g., 3.75 KHz signals in a 15 KHz carrier), and/or as a different type of channel structure.

MME 230 may select a particular broadcast method based on a configuration of access network 120, based on a load associated with access network 120, based on the types of UE devices 110 attached to access network 120, and/or using another criterion. As an example, if access network 120 is associated with at least a threshold percentage or number of UE devices 110 requiring PRB use for a particular LTE communication method, MME 230 may select a broadcast method that would minimize impact on the particular LTE communication method, such as by selecting a DC subcarrier broadcast method or a guard band broadcast method. If access network 120 is associated with less than the threshold percentage or number of UE devices 110, MME 230 may select to send wakeup signature beacon signals in a PRB of a PDSCH. As another example, MME 230 may determine if a guard band is available. For example, if narrow band IoT (NB-IoT) communication is used by access network 120, such NB-IoT communication may use an LTE guard band and the LTE guard band may not be available for broadcasting wakeup signature beacon signals.

MME 230 may further instruct the base station to provide information identifying the broadcast method for the wakeup signal to UE device 110 (block 1030). Providing information identifying the broadcast method to UE device 110 may enable UE device 110 to determine how to identify, and/or what type of signal to identify as, the wakeup signal. In some implementations, the information identifying the selected broadcast method may be provided in a message targeted to UE device 110. For example, MTC server 150 may select to send a "go to sleep" message to UE device 110 (also referred to herein as an "enter power saving mode" message), to instruct UE device 110 to enter a power saving mode, via MME 230, and MME 230 may add information into a "wakeup signal broadcast method" field of the go to sleep message before the go to sleep message is sent to UE device 110. The go to sleep message may be sent to UE device 110 via, for example, an RRC message. In other implementations, the information identifying the selected broadcast method may be provided in a broadcast message sent by eNodeB 210. For example, MME 230 may instruct eNodeB 210 to include the information identifying the selected broadcast method in a reserved field in an LTE SIB broadcast message.

MME 230 may instruct eNodeB 210 to send a go to sleep signal to UE device 110 (block 1040). For example, MTC server 150 may send a go to sleep message to UE device 110, to instruct UE device 110 to enter a power saving mode, via MME 230 and MME 230 may send the go to sleep message to UE device 110 via eNodeB 210. In some implementations, after UE device 110 has entered the power saving mode, MME 230 may be configured to perform a health check of the UE device 110 at particular intervals (e.g., if UE device 110 has been in the power saving mode longer than a health check threshold amount of time). The health check may corresponds to a wakeup message from MME 230 to cause UE device 110 to respond with a message indicating UE device 110 is operating correctly.

The process of FIG. 10 may further include receiving a wakeup request from a MTC-IWF device (block 1050), mapping a wakeup group ID and trigger type to a signature beacon ID (block 1060) and sending a signature beacon ID wakeup message to an eNodeB (block 1070). For example, MME 230 may receive a wakeup request from MTC-IWF device 160 to generate a wakeup message. The request may include a wakeup group ID, a trigger type ID (and/or other types of IDs, such as a priority ID), and a list of UE devices 110 associated with the wakeup group ID that MTC-IWF device 160 obtained from HSS 260. Wakeup message manager 460 of MME 230 may access wakeup DB 465 and may map the wakeup group ID and the trigger type ID to a particular signature beacon ID. Thus, for example, a wakeup group ID may be associated with different signature beacon IDs for different trigger types, for different priority types, and/or for different values of other types of identifiers. MME 230 may identify all eNodeBs 210 that are serving the identified UE devices 110 to which the wakeup request is to be sent and may send a wakeup request to each eNodeB 210 to generate a signature beacon associated with the identified signature beacon ID.

A determination may be made that UE device 110 is ready (block 1080) and MTC-IWF device 160 may be notified that the device is ready (block 1090). At a later time, MME 230 may determine that UE device 110 has woken up and is ready to communicate with MTC server 150. MME 230 may determine that UE device 110 is ready based on UE device 110 re-attaching to access network 120 and/or based on receiving an indication from eNodeB 210 that UE device 110 has exited a power saving mode and has communicated with eNodeB 210.

Figure 11:
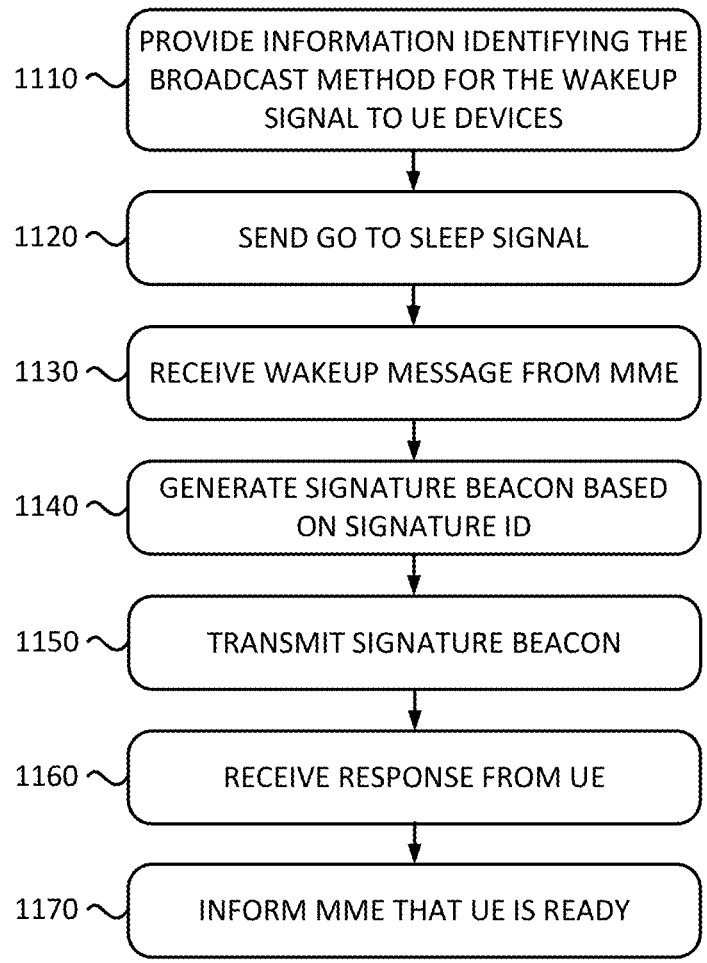
FIG. 11 is a flowchart of an exemplary process performed by an eNodeB according to an implementation described herein.

FIG. 11 is a flowchart of an exemplary process performed by eNodeB 210 according to an implementation described herein. In some implementations, the process of FIG. 11 may be performed by eNodeB 210. In other implementations, some or all of the process of FIG. 11 may be performed by another device or a group of devices separate from eNodeB 210 or including eNodeB 210.

The process of FIG. 11 may include providing information identifying the broadcast method for the wakeup signal to UE devices 110 (block 1110). As an example, eNodeB 210 may send information identifying the broadcast method for the wakeup signal via message to a particular UE device 110, such as an RRC message. As another example, eNodeB 210 may send information identifying the broadcast method for the wakeup signal via a broadcast message, such as an LTE SIB message. eNodeB 210 may send a go to sleep signal to UE device 110 (block 1120). For example, eNodeB 210 may receive a go to sleep message from MTC server 150 via MME 230 and may send the go to sleep message to UE device 110 via eNodeB 210.

The process of FIG. 11 may further include receiving a wakeup message from an MME (block 1130), generating a signature beacon based on a signature ID (block 1140), and transmitting the signature beacon (block 1150). For example, beacon generator 470 may receive a request from MME 230 to generate a signature beacon for a signature beacon ID. Beacon generator 470 may access beacon DB 475 to identify a particular signature beacon generator circuit and may activate the identified signature beacon generator circuit to generate and transmit the particular signature beacon. For example, beacon generator 470 may activate a circuit that generates a particular Zadoff-Chu waveform.

A response may be received from a UE device 110 (block 1160) and MME 230 may be informed that UE device 110 is ready (block 1170). For example, once UE device 110 wake up, UE device 110 may contact eNodeB 210 to attach or re-attach to access network 120. In response, eNodeB 210 may inform MME 230 that UE device 110 is ready for communicating with MTC server 150.

Figure 12:
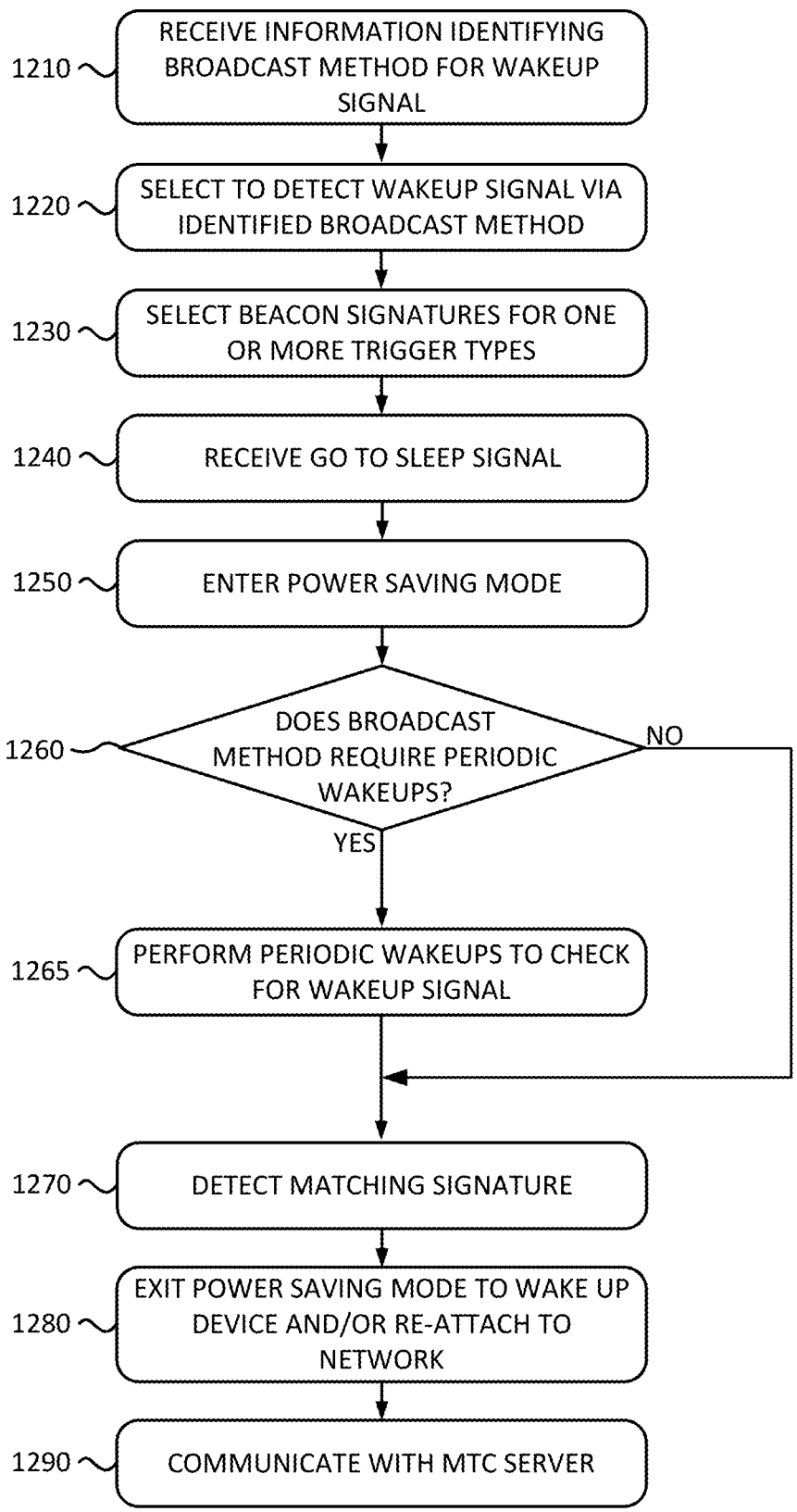
FIG. 12 is a flowchart of an exemplary process performed by user equipment according to an implementation described herein.

FIG. 12 is a flowchart of an exemplary process performed by UE device 110 according to an implementation described herein. In some implementations, the process of FIG. 12 may be performed by UE device 110. In other implementations, some or all of the process of FIG. 12 may be performed by another device or a group of devices separate from UE device 110 or including UE device 110.

The process of FIG. 12 may include receiving information identifying a broadcast method for a wakeup signal (block 1210) and selecting to detect the wakeup signal via the identified broadcast method (block 1220). For example, UE device 110 may receive an RRC message or a SIB broadcast message that includes information identifying a selected broadcast method. UE device 110 may retrieve the information identifying the selected broadcast method and may configure wakeup detector 535 to detect wakeup signals based on the selected broadcast method.

As an example, if MME 230 selects to use a broadcast method that does not require digital signal processing (DSP), such as a beacon signature wakeup signal sent via a DC subcarrier or in a guard band, wakeup detector 535 may select to detect the wakeup signal at a frequency associated with the subcarrier or guard band. As another example, if MME 230 selects to use a broadcast method that requires DSP, such as a beacon signature wakeup signal sent in a PRB or via DCI in a PDSCH, wakeup detector 535 may select to wake up at particular intervals to process information received via PDSCH to determine whether a beacon signature wakeup signal has been received.

UE device 110 may further select beacon signatures for one or more trigger types (block 1230). Wakeup detector 535 may be configured to activate one or more matched filters 555 that are selected for one or more trigger types based on information received from access network 120. For example, in some implementations, information identifying a particular beacon signature wakeup signal for a particular trigger type may be included in the message that includes the information identifying the selected broadcast method for the wakeup signal. In other implementations, the information identifying a particular beacon signature wakeup signal for a particular trigger type may be provided to UE device 110 separately from the message that includes the information identifying the selected broadcast method for the wakeup signal. Based on the information identifying a particular beacon signature wakeup signal for a particular trigger type, wakeup detector 535 may select to activate a particular matched filter 555 associated with the particular beacon signature wakeup signal. Activating a particular matched filter 555 may include activating a connection between the particular matched filter 555 and RFIC 520 so that wireless signals received by band 1 FEM 510 or band 2 FEM 515 are sent to the particular matched filter 555 and not to other, un-activated matched filters 555.

In yet other implementations, wakeup detector 535 may be configured during manufacture of baseband processor 630, during activation of a SIM card installed in UE device 110, manually by a user, by communicating with MTC server 150, and/or using another technique. Thus, for example, MTC server 150 may assign a particular matched filter 555 to UE device 110 and wakeup detector 535 may select to activate the particular matched filter 555 based on an instruction received from MTC server 150. As another example, a user may assign a particular matched filter 555 to UE device 110 via user interface 530 and wakeup detector 535 may select to activate the particular matched filter 555 based on an instruction received via user interface 530.

The process of FIG. 12 may further include receiving a go to sleep signal (1240) and entering power saving mode (block 1250). For example, UE device 110 may receive a go to sleep signal from MTC server 150 via eNodeB 210 and, in response, UE device 110 may enter a power saving mode. For example, power manager 545 may cause one or more processors or processing cores to enter an idle mode, may shut down or reduce power flow to output devices, sensor devices, communication devices and/or transitory memory devices, may terminate particular applications and/or process threads, and/or may perform other tasks to extend the battery life of UE device 110. Furthermore, power manager 545 may set a power saving mode flag to indicate that UE device 110 is in a power saving mode.

A determination may be made as to whether the broadcast method requires periodic wakeups (block 1260). If it is determined that the broadcast method requires periodic wakeups (block 1260—YES), UE device 110 may perform periodic wakeups to check for the wakeup signal (block 1265). Different types of broadcast methods may require different types of wakeup procedures. As an example, if the wakeup signal is selected to be sent in a PDSCH using a constant amplitude zero autocorrelation waveform, such as a Zadoff-Chu sequence, wakeup detector 535 may include a DSP circuit to process the PDSCH to retrieve the wakeup signal and provide the wakeup signal to matched filter 555. Thus, wakeup detector 535 may periodically wake up the DSP circuit to check for wakeup signals without waking up other components of UE device 110. As another example, if the wakeup signal is selected to be sent in DCI in a PDSCH, more DSP processing may be required. For example, wakeup detector 535 may need to wake up baseband processor 530 periodically to process DCI received via the PDSCH to determine whether the DCI includes a wakeup signal. If it is determined that the broadcast method does not require periodic wakeups (block 1260—NO), processing may proceed to block 1270 once a wakeup signal is detected via an activated matched filter 555.

A matching signature may be detected (block 1270) and the power saving mode may be exited to wake up the device and/or to re-attach to a network (block 1280). For example, baseband processor 530 may receive a wireless signal that causes one of the activated matched filters 555 to generate an output greater than a wakeup threshold. Wakeup detector 535 may generate a wakeup signal based on the output of the activated matched filter 555. Power manager 545 may map the wakeup signal to a particular set of actions, such as exiting the power saving mode immediately, exiting the power saving mode at a particular time in the future, or exiting the power saving mode in response to a particular condition, such as a wireless signal strength above a signal strength threshold, a particular sensor generating a signal above a signal threshold, and/or another type of condition. Furthermore, power manager 545 may instruct UE device 110 to perform one or more additional actions, such as attaching to access network 120, contacting MTC server 150 to request instructions, reporting a particular metric or another type of information to MTC server 150, etc.

Communication with MTC server 150 may take place (block 1290). For example, MTC server 150 may be informed by access network 120 that UE device 110 has woken up and is ready and may send instructions to UE device 110 to report information, receive instructions to perform a particular action, perform an update, and/or to otherwise communicate with UE device 110.

FIG. 13 is an exemplary signal flow diagram 1300 according to an implementation described herein. As shown in FIG. 13, signal flow diagram 1300 may include selecting a broadcast method for a wakeup signal (block 1310) and providing information identifying the selected broadcast method to UE device 110 via eNodeB 210 (signal 1320). In some implementations, the information identifying the selected broadcast method may be sent in a go to sleep message. In other implementations, a go to sleep message may be sent separately to UE device 110.

In response to receiving the go to sleep message, UE device 110 may enter a PSM and may monitor for a wakeup signal (block 1325). UE device 110 may select a particular matched filter 535 based on information received together with the information identifying the broadcast method, received in the go to sleep message, or received previously.

As an example, HSS 260 may have received a subscription request on behalf of UE device 110, added UE device 110 to a particular wakeup group associated with a particular signature beacon wakeup signal associated with the particular matched filter 535, and provided information identifying the particular signature beacon wakeup signal to UE device 110. As another example, UE device 110 may be programmed to select one or more default signature beacons once UE attaches to access network 120 or when a tracking area update (TAU) is performed between UE device 110 and MME 230. In other implementations, UE device 110 may be programmed locally by a technician or user via an input device associated with UE device 110 or via a wired connection between UE device 110 and another device.

At a later time, MTC server 150 may select to wake up UE device 110 and may send a wake up request to MTC-IWF device 160 (signal 1330). The wake up request may include a group ID and a trigger ID (as well as additional IDs, such as a priority ID). MTC-IWF device 160 may send a verification and a routing request to HSS 260 (signal 1340) to determine UE devices 110 and MMEs 230 to which the wakeup request should be sent. HSS 260 may verify MTC server 150, may access UE DB 445 to identify UE devices 110 subscribed to the group ID and to identify MMEs 230 that are serving the identified UE devices 110, and may respond to the request by providing the request information to MTC-IWF device 160 (signal 1345).

MTC-IWF device 160 may send a wakeup message to the identified one or more MMEs 230 (signal 1350). The wakeup message may include the group ID and the trigger type ID. Furthermore, the wakeup message may identify UE devices 110 associated with the group ID and obtained from HSS 260. MME 230 may map the wake up request group ID and trigger type ID to a signature beacon ID and may determine eNodeBs 210 associated with the identified UE devices 110. MME 230 may then send a wakeup message with the signature beacon ID to the identified eNodeBs 210 (signal 1355). eNodeB 210 may receive the wakeup message and may generate a signature beacon based on the signature beacon ID (signal 1360).

UE device 110 may detect the matching signature beacon and may wake up the device (block 1365). UE device 110 may re-attach to access network 120 via eNodeB 210 and MME 230 (signals 1370 and 1375) and MME 230 may inform MTC-IWF device 260 that UE device 110 is ready (signal 1380). The message from MME 230 to MTC-IWF device 160 may include information identifying UE device 110, such as a telephone number or another identifier associated with UE device 110. MTC-IWF device 160 may forward the indication that UE device 110 is ready to MTC server 150 (signal 1385). In response, MTC server 150 may begin communicating with UE device 110 by, for example, delivering MTC traffic to UE device 110 via, for example, PGW 250 (signals 1390 and 1395).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 8-12, and series of signal flows have been described with respect to FIG. 13, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   selecting, by at least one computer device, a broadcast method for a wakeup signal for a wireless communication device, wherein the broadcast method includes broadcasting a wakeup signature beacon signal in a guard band of a Long Term Evolution (LTE) band;
   configuring, by the at least one computer device, a base station to broadcast the wakeup signal using the selected broadcast method;
   providing, by the at least one computer device, information identifying the selected broadcast method to the wireless communication device; and
   providing, by the at least one computer device, the wakeup signal to the wireless communication device via the base station using the selected broadcast method, wherein the wakeup signal includes the wakeup signature beacon signal, wherein providing the wakeup signal to the wireless communication device includes:
      instructing the base station to broadcast a signal that includes the wakeup signature beacon signal in the guard band of the LTE band.

2. The method of claim 1, wherein providing the information identifying the selected broadcast method to the wireless communication device includes at least one of:
   sending an enter power saving mode message to the wireless communication device, wherein the enter power saving mode message includes the information identifying the selected broadcast method, or
   broadcasting the information identifying the selected broadcast method in a reserved field of an LTE System Information Block (SIB).

3. The method of claim 1, further comprising:
   receiving a wakeup request from a machine-type communication interworking function (MTC-IWF) device; and
   mapping the received wakeup request to the wakeup signature beacon signal associated with the wireless communication device.

4. The method of claim 3, wherein mapping the received wakeup request to the wakeup signature beacon signal associated with the wireless communication device includes:
   identifying a group associated with the received wakeup request;
   identifying a trigger type associated with the received wakeup request; and
   selecting the wakeup signature beacon signal based on the identified group and the identified trigger type.

5. The method of claim 4, wherein the trigger type identifies a particular wakeup process that instructs the wireless communication device to perform at least one of:
   exiting a power saving mode immediately;
   exiting the power saving mode at a scheduled time in the future;
   attaching to a wireless access network;
   contacting a server device to request instructions; or
   reporting a particular metric to the server device.

6. The method of claim 1, wherein the wakeup signature beacon signal includes a constant amplitude zero autocorrelation waveform.

7. A computer device comprising:
   a memory storing instructions; and
   a processor configured to execute the instructions to:
      select a broadcast method for a wakeup signal for a wireless communication device, wherein the broadcast method specifies a band defined with respect to a Long Term Evolution (LTE) band;
      configure a base station to broadcast the wakeup signal using the selected broadcast method;
      provide information identifying the selected broadcast method to the wireless communication device; and
      provide the wakeup signal to the wireless communication device via the base station using the selected broadcast method, wherein the wakeup signal includes a wakeup signature beacon signal, wherein providing the wakeup signal to the wireless communication device includes:
         instructing the base station to broadcast a plurality of subcarrier signals in the LTE band, wherein each of the plurality of subcarrier signals corresponds to a different wakeup signature beacon signal associated with a group of wireless communication devices.

8. The computer device of claim 7, wherein the broadcast method includes broadcasting the wakeup signature beacon signal in a physical resource block of the LTE band, and wherein, when providing the wakeup signal to the wireless communication device, the processor is further configured to:
   instruct the base station to broadcast a physical resource block that includes the wakeup signature beacon signal.

9. The computer device of claim 7, wherein the broadcast method includes broadcasting the wakeup signature beacon signal as a subcarrier signal in a subcarrier of the LTE band, and wherein, when providing the wakeup signal to the wireless communication device, the processor is further configured to:
  instruct the base station to broadcast a subcarrier signal that includes the wakeup signature beacon signal in the subcarrier of the LTE band.

10. The computer device of claim 7, wherein, when providing the information identifying the selected broadcast method to the wireless communication device, the processor is further configured to:
  send an enter power saving mode message to the wireless communication device, wherein the enter power saving mode message includes the information identifying the selected broadcast method.

11. The computer device of claim 7, wherein, when providing the information identifying the selected broadcast method to the wireless communication device, the processor is further configured to:
  broadcast the information identifying the selected broadcast method in a reserved field of an LTE System Information Block (SIB).

12. The computer device of claim 7, wherein the processor is further configured to:
  receive a wakeup request from a machine-type communication interworking function (MTC-IWF) device;
  identify the group of wireless communication devices as being associated with the received wakeup request;
  identify a trigger type associated with the received wakeup request; and
  select the wakeup signature beacon signal based on the identified group and the identified trigger type.

13. A wireless access network system comprising:
  a Mobility Management Entity (MME) device configured to:
    select a broadcast method for a wakeup signal for a wireless communication device, wherein the broadcast method includes broadcasting a wakeup signature beacon signal in a guard band of a Long Term Evolution (LTE) band;
    instruct a base station to broadcast the wakeup signal using the selected broadcast method;
    provide information identifying the selected broadcast method to the wireless communication device; and
    provide the wakeup signal to the wireless communication device via the base station using the selected broadcast method, wherein the wakeup signal includes the wakeup signature beacon signal, wherein, when providing the wakeup signal to the wireless communication device, the MME device is configured to:
      instruct the base station to broadcast a signal that includes the wakeup signature beacon signal in the guard band of the LTE band.

14. The wireless access network system of claim 13, further comprising:
  an eNodeB device configured to:
    generate the selected wakeup signature beacon signal; and
    transmit the generated wakeup signature beacon signal.

15. The method of claim 1, further comprising:
  determining that a network, associated with the at least one computer device, is associated with at least a threshold percentage or number of wireless communication devices requiring use of Physical Resource Blocks (PRBs) for communication; and
  selecting the broadcast method that includes broadcasting the wakeup signature beacon signal in the guard band of the LTE band based on determining that the network is associated with the at least a threshold percentage or number of wireless communication devices requiring use of PRBs for communication.

16. The method of claim 1, further comprising:
  determining that the guard band of the LTE band is available; and
  selecting the broadcast method that includes broadcasting the wakeup signature beacon signal in the guard band of the LTE band based on determining that the guard band of the LTE band is available.

17. The method of claim 1, wherein wakeup signal corresponds to a signal with a bandwidth of about 10 kilohertz.

18. The wireless access network system of claim 13, further comprising:
  a machine-type communication interworking function (MTC-IWF) device configured to:
    send the wakeup signal for the wireless communication device to the MME device.

19. The wireless access network system of claim 13, wherein the MIME device is configured to select another broadcast method for another wireless communication device, wherein the other broadcast method includes broadcasting the wakeup signature beacon signal in a Direct Current (DC) subcarrier of the LTE band.

20. The wireless access network system of claim 13, wherein the MME device is configured to select another broadcast method for another wireless communication device, wherein the other broadcast method includes broadcasting the wakeup signature beacon signal in a Physical Resource Block (PRB) of the LTE band.

* * * * *